Figures 1, 2:
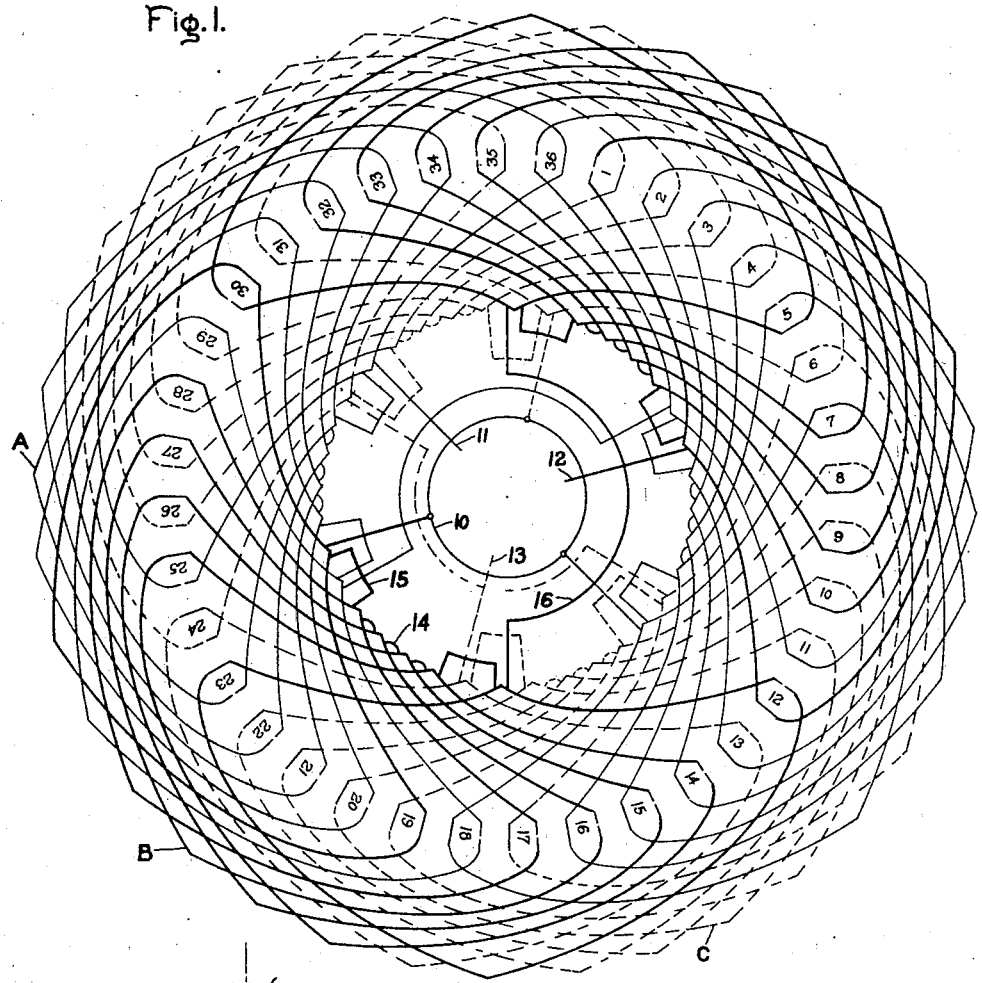

March 17, 1925.  1,530,466

C. MACMILLAN

INDUCTION MOTOR WINDING

Filed Aug. 8, 1924

Inventor:
Campbell Macmillan,
by
His Attorney.

Patented Mar. 17, 1925.

1,530,466

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

INDUCTION-MOTOR WINDING.

Application filed August 8, 1924. Serial No. 730,966.

*To all whom it may concern:*

Be it known that I, CAMPBELL MACMILLAN, a citizen of the United States, residing at Schenectady, in the county of Schenectady, State of New York, have invented certain new and useful Improvements in Induction-Motor Windings, of which the following is a specification.

My invention relates to the primary winding of induction motors and its object is to provide a simple and efficient winding arrangement which is substantially free from detrimental harmonics.

In selecting primary induction motor windings for use in conjunction with squirrel cage secondaries, it is necessary to take certain precautions against the production of higher harmonics of flux and current which might prove detrimental in operation. The objectional operating features to be guarded against are chiefly induction subsynchronous and synchronous subsynchronous speeds commonly called crawling speeds and locking at standstill. These defects are caused by higher harmonics of primary current distribution, of permeance variations in the air gap, or by combinations of the two in certain relationships.

The harmonics of primary current distribution, or winding harmonics, may be reduced by care in the selection of appropriate coil pitches in conjunction with the distribution constants which is determined by the number of phases and type of winding used. The permeance harmonics must be taken care of by a judicious selection of slot numbers, primary and secondary. In the successful design of an induction motor other factors must also be considered with the problem of eliminating harmful harmonics. Thus, it is desirable that the winding space be completely and efficiently utilized, and that the end connections be simple and not require an excessive amount of copper. From a manufacturing standpoint, it is desirable that the coils be similar and easily replaced. The present invention relates to a double layer primary winding for induction motors in which the above-mentioned factors, going to make up a successful design, are considered together and in which the ideal conditions are realized in a high degree.

The features of my invention which are believed to be novel and patentable will be pointed out in the claims appended hereto.

For a better understanding of my invention, reference is made in the following description to the accompanying drawing wherein Fig. 1 represents the primary winding of a two pole, three phase, squirrel cage induction motor built in accordance with my invention, and Fig. 2 is a vectorial representation of how a detrimental winding harmonic is reduced to a harmless value by such a winding arrangement.

Referring to Fig. 1, I have here represented a two layer primary stator winding for a two pole, three phase motor having 36 slots with two coil sides per slot, one above the other. The three phases are represented by distinguishing lines. Thus, phase A is represented by light full lines, phase B by heavy full lines and phase C by broken lines. It will be noticed that the coils are all similar and, hence, desirable from a manufacturing standpoint.

Hitherto it has been universally assumed that the best results from the point of view of current distribution for any specified number of phases and slots per pole would always be obtained by placing all coils of one phase per pole in adjacent slots. The truth of this assumption is evident when only the fundamental distribution of current is considered, but when harmonics are taken into consideration it may be more profitable to make a slight sacrifice in the highest value of fundamental distribution factor, in order to reduce the distribution factors of harmonics, and I have discovered that such a result can be obtained in certain cases by interchanging the positions of marginal coils in adjacent phase belts without appreciably affecting the fundamental distribution and without sacrificing mechanical simplicity. Such an arrangement is represented in Fig. 1.

The two pole, three phase winding of Fig. 1 is star connected, 10 being the star point. Points 11, 12, and 13 represent the line connections to the phases A, B, and C, respectively. The connections between coils of a phase belt constitute the short connections 14 and the slightly longer connections 15, and the connections from one pole winding to the other pole winding is represented at 16. The pitch, it will be noted, is about 61% which, in accordance with standard practice, makes the winding relatively immune from the 7th winding harmonic.

Considering one layer of this winding, it will be seen that it has the following slot arrangement CAAAABABBBBCBCCCCA per pole whereas the usual arrangement is AAAAAABBBBBBCCCCCC. The first-mentioned arrangement having marginal coils in adjacent phase belts interchanged is what I term an "interspersed" coil winding. By means of the usual vector polygon representation of distribution constants it can be shown that the particular interspersed coil arrangement shown is highly advantageous from the point of view of suppressing the fifth harmonic without seriously affecting the fundamental distribution.

The vector polygon representation for this particular case is shown in Fig. 2 where it is compared to that obtained by the usual winding arrangement. In the present case, we have six slots per phase belt representing 60 electrical degrees so that the vector voltage per slot must be combined at angles of 10° (electrical). The distribution factor for the usual winding would be represented by the length of the cord 20—21 in Fig. 2. By the term distribution factor I mean the ratio of the vector sum to the algebraic sum of the voltages contributed by adjacent conductors in series. Expressed algebraically, this is for the usual winding:

$$\frac{2 \cos 5° + 2 \cos 15° + 2 \cos 25°}{6} = .956143.$$

Now for the interspersed fundamental, the outside coil sides of a phase belt are separated from the remainder of the phase belt by one slot space so that for these outside coils the voltage vector must be drawn at an angle of 20° to the adjacent voltage vector of the phase belt instead of at 10° as with the normal winding. This is represented by the dotted lines 22—23 and 24—25. The fundamental distribution factor for the interspersed arrangement is represented by the length of the cord 22—25. Expressed algebraically, this is $$\frac{2 \cos 5° + 2 \cos 15° + 2 \cos 35°}{6} = .92709$$

which is only slightly less than that for the normal winding.

Considering, now, the fifth harmonic, the slot intervals correspond to 50 electrical degrees, that is to say, the voltage vectors for the fifth harmonic should be drawn at 50° to each other so that the fifth harmonic distribution vector diagram per phase belt for the normal winding would be represented by the open polygon 26, 27, 28 in Fig. 2, and the distribution factor by the length of cord 26—28. Expressed algebraically, this is:

$$\frac{2 \cos 25° + 2 \cos 75° + 2 \cos 125°}{6} = .19718.$$

In most cases this fifth harmonic would be harmful and cause the motor to stick at a subsynchronous speed.

For the interspersed winding, the fifth harmonic voltage vector in the outside slots of the phase belt must be drawn at an angle of 100° instead of 50° to the next adjacent voltage vectors of the phase belt because of the intervening slot so that the vector diagram now becomes 29—31—27—33—30 and the distribution factor equal to the length of cord 29—30. Expressed algebraically, this is $$\frac{2 \cos 25° - 2 \cos 75° - 2 \cos 175°}{6} = .05631.$$

Comparing these values, it is seen that the fundamental distribution factor has been reduced by 3% by interspersing the coils while the fifth harmonic has been reduced by 71%. The fifth harmonic is thus reduced to a value when it renders the crawling speed tendency negligible and harmless while the fundamental distribution is not appreciably decreased.

The same process of reasoning applies equally well to the other layer of the double layer winding shown in Fig. 1 and the superposition of the two layers detracts nothing from the relative immunity of each layer from harmonics. Since a double layer winding is specified it is subject to changes in coil pitch without disturbing the interspersing in the separate layers. Thus, a coil pitch may be selected which renders the machine relatively immune from one detrimental harmonic, for example, the seventh harmonic in accordance with standard practice, and then the coils may be interspersed to render the winding relatively immune from another detrimental harmonic, for example, the fifth harmonic in accordance with the present invention.

In the most usual cases the number of slots may be such as to provide no opportunity for the complete elimination of one or two harmonics by reduced pitch and interspersing, but each method may secure a substantial compromise reduction in both harmonics, and the effect of both methods, used jointly, is to multiply together the reduction factors obtained by each method separately. For example, in the case cited, a coil of 61% pitch only reduces the full pitch value of the 5th harmonics to 95% and of the 7th harmonics to 27%. Interspersing, which in this case corresponds in effect to a coil pitch reduction in each layer to 83%, reduces the full pitch values of the harmonics to 15% and 19% respectively. The combined result is a reduction of the 5th harmonics to 95x.15 1425, and of the 7th to 27x/.19 0514 of full pitch values. This may be accomplished without appreciably lowering the efficiency of the machine as regards normal operation. Thus, in Fig. 1, it is seen that the periphery of the stator is completely utilized with no idle coils or slots, while similar form wound coils may be used without complicated or lengthy end connections.

It is not always easy to anticipate whether a particular machine will be subject to a harmful harmonic or not. The present invention affords an easy way of changing connections after a machine has come to test and found to have a harmful harmonic so as to reduce such harmonic to a harmless value. Thus, suppose the machine having the same pole number, pitch, etc. as represented in Fig. 1, but having the coils connected in the usual way without interspersing, comes to test, and is found to have a harmful fifth harmonic. It is only necessary to change the end connections of a few coils to render the machine immune to this harmful harmonic. This is done by merely changing shorter end connections like 14 to the longer end connections like 15, so as to change the connection of the coils in adjacent slots in series at the extremities of each phase belt to the interspersed arrangement illustrated.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other arrangements.

What I claim as new and desire to secure by Letters Patent of the United States is:—

1. A primary member for induction motors comprising a slotted magnetic member having a distributed double layer alternating current winding therein, said winding being made up of similar coils with marginal coils in adjacent phase belts interchanged.

2. A primary member for induction motors comprising a slotted magnetic member having a distributed double layer alternating current winding therein, said winding having a coil pitch selected so as to make the winding substantially immune from a particular winding harmonic and having marginal coils in adjacent phase belts interchanged to reduce the harmful effects of another winding harmonic.

3. A primary member for induction motors comprising a slotted magnetic member, a distributed double layer alternating current winding in said slots, said winding being made up of similar coils and having marginal coils of adjacent phase belts interchanged in both layers.

4. A primary member for induction motors comprising a slotted magnetic member, a distributed double layer alternating current winding in said slots made up of similar coils, the marginal coils of each phase belt being separated from the remainder of the phase belt by at least one slot in both layers.

5. A primary member for induction motors comprising a slotted magnetic member having a distributed double layer alternating current winding therein, said winding having a coil pitch selected to reduce harmful harmonics and having marginal coils in adjacent phase belts of both layers interchanged to obtain a still further reduction in such harmonics.

In witness whereof, I have hereunto set my hand this 7th day of August, 1924.

CAMPBELL MACMILLAN.